United States Patent [19]

Seibert et al.

[11] Patent Number: 4,817,767
[45] Date of Patent: Apr. 4, 1989

[54] HYDRAULIC BRAKE SYSTEM FOR AUTOMOTIVE VEHICLES

[75] Inventors: Wolfram Seibert, Pfungstadt; Guenter Trach, Offenbach, both of Fed. Rep. of Germany

[73] Assignee: Alfred Teves GmbH, Frankfurt am Main, Fed. Rep. of Germany

[21] Appl. No.: 22,679

[22] Filed: Mar. 6, 1987

[30] Foreign Application Priority Data

Mar. 6, 1986 [DE] Fed. Rep. of Germany ....... 3607366

[51] Int. Cl.$^4$ .......................... B60T 11/00; B60T 8/42
[52] U.S. Cl. ................................... 188/348; 303/116; 60/565; 188/347
[58] Field of Search ........... 188/196 R, 196 A, 196 C, 188/347, 348; 303/6 A, 10, 13, 11, 14, 100, 110, 113, 114; 60/565, 555, 590

[56] References Cited

U.S. PATENT DOCUMENTS

| | | | |
|---|---|---|---|
| 1,899,009 | 2/1933 | Bradbury | 188/348 |
| 2,282,472 | 10/1939 | Herman et al. | 60/590 |
| 3,163,007 | 12/1964 | Scott | 60/565 |
| 3,712,057 | 1/1973 | Aike et al. | 303/60 X |
| 4,404,803 | 9/1983 | Steffes | 303/13 X |
| 4,416,491 | 11/1983 | Belart et al. | 303/113 |
| 4,435,021 | 3/1984 | Hoenick | 303/116 X |
| 4,524,312 | 6/1985 | Matsumoto et al. | 303/20 X |
| 4,699,435 | 10/1987 | Wupper | 303/11 |
| 4,708,406 | 11/1987 | Takagi et al. | 303/100 X |

FOREIGN PATENT DOCUMENTS

| | | | |
|---|---|---|---|
| 1431996 | 3/1969 | Fed. Rep. of Germany | 188/347 |
| 2430167 | 1/1976 | Fed. Rep. of Germany . | |
| 3016683 | 11/1981 | Fed. Rep. of Germany . | |
| 3315731 | 10/1984 | Fed. Rep. of Germany . | |
| 3417018 | 11/1985 | Fed. Rep. of Germany . | |
| 3439258 | 4/1986 | Fed. Rep. of Germany . | |
| 0013249 | 2/1981 | Japan | 188/196 R |
| 0008556 | 1/1984 | Japan | 188/196 A |
| 2121897 | 6/1982 | United Kingdom . | |
| 2138901 | 10/1984 | United Kingdom . | |
| 2160274 | 12/1985 | United Kingdom | 303/114 |
| 2178497 | 2/1987 | United Kingdom . | |

*Primary Examiner*—Andres Kashnikow
*Assistant Examiner*—Timothy E. Newholm
*Attorney, Agent, or Firm*—James B. Raden

[57] ABSTRACT

A hydraulic brake system for automotive vehicles with a master brake cylinder (1) connected to an unpressurized reservoir and with a brake line (13, 14) connected to a working chamber (4, 5) of the master brake cylinder and leading to pressure control valves of a brake slip control device (40). The pressure control valves are followed by at least one wheel brake (18, 19) with the working chamber (4, 5) of the master brake cylinder (1) being connectable to a pressure medium source (29) upon the start of the brake slip control device. To ensure that in brake systems of different vehicle types, the wheel brakes of which have clearances differing in size, the same master brake cylinder can be used without the master brake cylinder having an undesired long pedal travel and thus a great overall length. This is achieved in that, upon the onset of the application of the brake pedal (3), a pressure medium amount coordinated with the clearance of the brakes can be suppled from the pressure medium source (29) to the brake cylinders of the wheel brakes (18, 19).

6 Claims, 2 Drawing Sheets

4,817,767

HYDRAULIC BRAKE SYSTEM FOR AUTOMOTIVE VEHICLES

BACKGROUND OF THE INVENTION

This invention relates to a hydraulic brake system for automotive vehicles with a master brake cylinder connected to an unpressurized reservoir and with a brake line connected to a working chamber of the master brake cylinder and leading to pressure control valves of a brake slip control device. The pressure control valves are followed by at least on wheel brake, with the working chamber or the master brake cylinder being connectable to a pressure medium source upon the start of the brake slip control device.

In brake systems of this type, for repeated actuation of the wheel brake after a relief in pressure, a pressure medium amount is required during the operation of the brake slip control device, which far exceeds the delivery capacity of the master brake cylinder. Thus, during the operation of the brake slip control device, it is necessary to supply the wheel brake, independently of the master brake cylinder, with pressure medium from an additional pressure medium source such as an energy supply system.

A brake system is known from German published patent application No. P 34 39 258 where a hydraulic-energy-supply-system-fed brake booster is provided for the actuation of the master brake cylinder. In this brake system, the brake line is connectable with the booster chamber of the brake booster by way of an electromagnetically operable control valve of the brake slip control device and by way of a non-return valve following the valve. This is for the purpose of supplying the wheel brake cylinders with pressure medium from the energy supply system during the operation of the brake slip control device. Further, a controllable non-return valve is provided between the master brake cylinder and the connection point of the control valve which can be switched into a locking position by means of the pressure supplied by way of the control valve. In the locking position the pressure medium is only able to flow back to the master brake cylinder. Thereby, the master brake cylinder is kept in a ready position during the operation of the brake slip control device. This solution is limited, however, to brake systems with a hydraulic brake booster. Such brake systems, however, are relatively intricate and expensive and thus are generally not considered for use in smaller vehicles. A further disadvantage of this prior brake system is that the readiness of the hydraulic brake booster and brake slip control device are interdependent.

Depending on the vehicle type, brake calipers with varying sizes for clearance are built into the disc brakes. So as to be able to use one brake system for different clearances, the length of the master brake cylinder must be rated such as to conform with the largest needed clearance. Thus, in case of a larger clearance, there will result a relatively long pedal travel. However, master brake cylinders with great overall lengths are not desirable.

Thus, stepped master brake cylinders with differently effective diameters, coordinated with the respective clearance, are being used so as to avoid long pedal travels and excessive overall lengths. Such stepped master brake cylinders, however, are relatively intricate and expensive.

It is thus an object of the present invention to further develop a brake system of the type mentioned above so as to ensure that the same master brake cylinder can be used in brake systems of different vehicle types the wheel brakes of which have clearances differing in size, without the master brake cylinder having a long pedal travel and thus a great overall length.

SUMMARY OF THE INVENTION

According to the present invention this object is achieved in that, upon the onset of the application of the brake pedal, a pressure medium amount coordinated with the clearance of the brakes can be supplied from the pressure medium source to the brake cylinders of the wheel brakes. Thus, in brake systems with brake slip control, the existing pressure medium source is additionally used for generating a force to overcome the clearance of the wheel brakes. The pressure medium amount required to this end no longer has to be generated by the actuation of the master brake cylinder. Thus, it is possible to use the same master brake cylinders for wheel brakes with clearances of differing size.

According to a preferred embodiment, the pressure medium source contains a pump wth a drive which, by way of a switch operable by the brake pedal, can be switched on for a predetermined time during which the pressure medium amount required to overcome the wheel brake clearance flows into the brake cylinders. In this arrangement, no specific control valves are required for connecting the pressure medium source. The "on" time is so small that the drive and pump may be rated for short-period duty and thus allow manufacture at a more favorable cost.

Preferably, an adjustable-response-duration time element is actuatable by the switch, the response duration of the time element being adjustable to the delivery time of the pump which is required to overcome the clearance of the wheel brakes. Such time elements are available at reasonable prices. It is expedient to use a timing relay as the time element. It is advantageous if the time element is a component of the electric part of the brake slip control device. The time element may, for example, be combined with parts of the brake slip control device in one assembly unit, thus rendering manufacture and assembly more economical. By means of the devices of the present invention it is possible to achieve a reduction in the pedal travel. No additional hydraulic parts are required. Adaptation to the respective clearance is easily and rapidly possible.

In another advantageous embodiment of the present invention, the pressure medium source contains a pump with a drive which can be switched on by way of a switch operable by the brake pedal and which can be switched off by way of a pressure switch responding in a preset manner to a pressure in the brake cylinders. The response pressure expediently is adjusted so as to ensure that the pressure switch will put the pump out of operation as soon as the pressure reaches a certain threshold value corresponding to the clearance compensation. In this embodiment, an adaptation of the "on" time to the respective clearance is no longer necessary. Further, a brake pad wear compensation is achieved in this arrangement. So as to reliably keep the brake system closed relative to the pump outlet during the "off" times of the pump drive, a non-return valve is expediently arranged between the pump outlet and the working chamber of the master brake cylinder.

The present invention can also be used with advantage in a tandem master brake cylinder in that the two working chambers thereof are separately connectable to the pressure medium source. According to the present invention, the actuation of the master brake cylinder can be effected by a brake booster, preferably by a vacuum brake booster. In this respect, it is advantageous that the brake booster be driven independently of the pressure medium source, thus remaining effective in case of failure of the pressure medium source.

BRIEF DESCRIPTION OF THE DRAWING

The present invention will be explained in greater detail with reference being made to the embodiments thereof represented in the accompanying drawing wherein.

DETAILED DESCRIPTION

Figure 1:
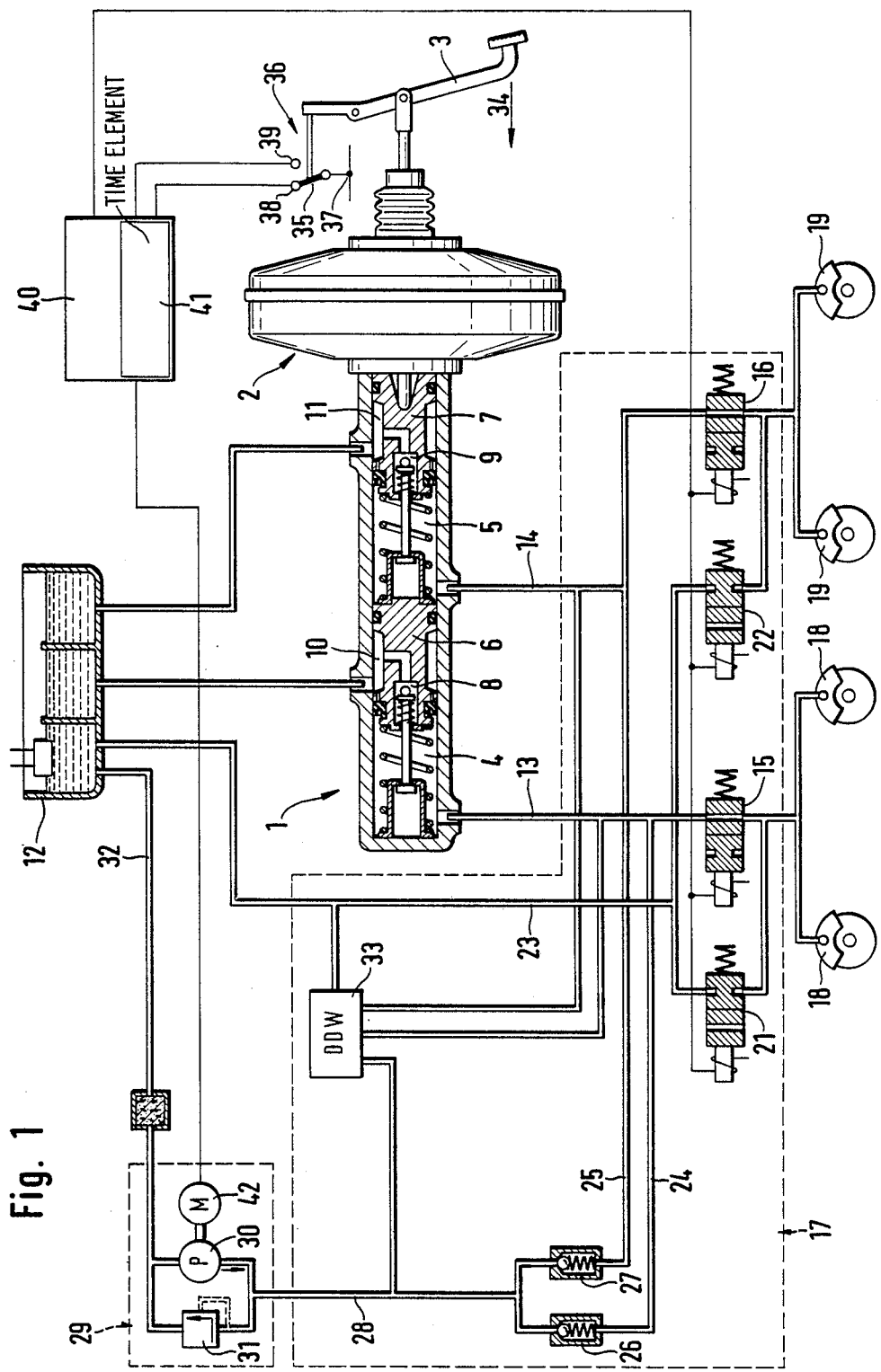
FIG. 1 shows a connection diagram of a first embodiment of a hydraulic dual circuit brake system for an automotive vehicle with a partial longitudinal section through a braking pressure generator; and, FIG. 2 is a connection diagram of a second embodiment of a hydraulic dual circuit brake system for an automotive vehicle with a partial longitudinal section through a braking pressure generator.

Referring now to FIG. 1, a braking pressure generator consists of a tandem master brake cylinder 1 and of a vacuum booster 2 operable by a brake pedal 3. The tandem master brake cylinder 1 shown in section has two separate working chambers 4, 5 which can be reduced in size by an operating stroke of the master cylinder pistons 6, 7. By way of central valves 8, 9 which are open in the illustrated initial position, the working chambers 4, 5 are connectable with supply chambers 10, 11 connected to an unpressurized supply reservoir 12.

Brake lines 13, 14 lead from the working chambers 4, 5 of the tandem master brake cylinder 1 to solenoid valves 15, 16 of a brake slip control device 40. The solenoid valves 15, 16 are open when currentless and are arranged in a valve block 17. Connected to the solenoid valves 15, 16 in each case are two brakes 18 and 19, respectively. One of wheel brakes 18 and 19, respectively, at a time are associated with a front wheel of the vehicle and the other one of the wheel brakes 18 and 19, respectively, being associated with a rear wheel of the vehicle lying diagonally with respect to the front wheel. Thus, there is a dual circuit brake system with a diagonal circuit allotment.

Further, the wheel brakes 18 and 19 are connected to two solenoids valves 21, 22 of the valve block 17. The solenoid valves are closed when currentless and their inlets are connected with the supply reservoir 12 by way of a return line 23.

A pressure line 24, 25 branches off each brake line 13, 14. Each pressure line 24, 25 leads to a separate non-return valve 26, 27 which is closed in the initial position and which is likewise integrated in the valve block 17. The non-return valves 26, 27 are arranged so as to open only towards the pressure lines 24, 25. A pressure line 28 leads from the non-return valves 26, 27 to the outlet of a pressure medium source 29 such as a pump aggregate consisting of an electric-motor-driven pump 30 and of a relief valve 31 and the inlet of which pump aggregate is connected to the supply reservoir 12 by way of a line 32. The pressure in the brake lines 13, 14 and in the pressure line 28 is monitored by a differential pressure alarm switch 33 likewise arranged in the valve block 17.

Connected with the brake pedal 3 is a contact 35 of a change-over switch 36 which on the input side is connected to a pole 37 of a voltage source which may be the battery of the vehicle. Both the operating and quiescent current outputs 38, 39 of the change-over switch 36 are connected to the brake slip control device 40 wherein a time element 41, and preferably a timing relay, is arranged which, by way of the operating current output, is applied to voltage upon the actuation of the brake pedal 3. The time element 41 has a make contact (non-illustrated) arranged in a power supply line of an electric-motor drive 42 for the pump 30. The time element 41 has a preset response duration. During the duration of response, the drive 42, e.g., a direct current motor, has voltage applied. Then, the drive 42 is switched off again. The response duration is coordinated with a certain pressure medium amount delivered by the pump 30 during this time. Due to the excess pressure thus resulting, the pistons of the wheel brakes 18, 19 (while overcoming the clearance between pad and brake disc) will push the brake pads arranged in front of them against the friction surfaces of the rotating brake discs. The pressure medium volume needed for overcoming the clearance of the brakes thus may easily be adapted to different vehicle types by way of the time element 41 and, hence, the delivery time.

The described brake system functions as follows:

The brake pedal 3 is moved in the direction of the arrow 34 so as to initiate a braking action, the vacuum brake booster 2 then will be actuated and the change-over switch 36 will be actuated by the application of the contact 35 to the operating current output 38. Thereby, the vacuum brake booster 2 will move the two master cylinder pistons 6, 7 into the tandem master brake cylinder 1, whereby, at first, the central valves 8, 9 will be closed and the working chambers 4, 5 will be separated from the supply chambers 10, 11. By the actuation of the change-over switch 36, the time element 41 will be actuated which thereby will apply the drive 42 to the operating voltage. The pump 30 will start operating and, after the closure of the central valves 8, 9, will deliver pressure medium into the wheel brake cylinders of the wheel brakes 18, 19 by way of the pressure lines 24, 25 and the open solenoid valves 15, 16. By way of the pressure medium, a pressure will build up in the wheel brakes, thus the pistons displacing themselves with the brake pads in the direction of the braking surfaces. The amount of the pressure medium fed into the wheel brake cylinders is coordinated with the clearance between the brake pads and braking surfaces. The operating time will terminate when the pressure fluid volume required for the application of the brake pads to the braking surfaces will have been delivered. At the end of the operating time the drive 42 will be switched off, thus the pump no longer delivers any pressure medium. By means of operating times, differently adjusted as regards their lengths, it is possible to generate the pressure medium volumes required to overcome the clearances of different brakes. The operating time can be adjusted easily and quickly. No further complicated hydraulic elements are required for this purpose. There will rather result a pedal travel reduction, this enabling the overall length of the used tandem master brake cylinders to be small.

By means of a further displacement of the master cylinder pistons 6, 7 a pressure will build up in the working chambers 4, 5. The pressure will propagate to the wheel brakes 18 and 19 by way of the brake lines 13, 14 and the open solenoid valves 15, 16 and will actuate the wheel brakes 18, 19 in correspondence with the actuating force applied to the brake pedal 3. In this actuating phase, the pump aggregate 29 will no longer be switched on, thus no pressure being built up in the pressure line 28. The non-return valves 26, 27 will be closed. In addition the pressure in the pressure lines 24, 25 connected to the brake lines 13, 14 keeps the valves in the closed position.

When the brake slip control device 40 registers a lock-up tendency of a vehicle wheel during a braking action, immediately the pump aggregate 29 will be switched on anew and the pump 30 will be driven at full speed. Thereby a pressure will build up in the pressure line 28, which pressure will be above the actuating pressure in the brake lines 13, 14 or in the pressure lines 24, 25, respectively. Thus, the non-return valves 26, 27 will open and the pressure medium amount delivered by the pump 30 will be supplied into the brake lines 13, 14 by way of the pressure lines 24, 25. The pressure medium flowing in will cause the master cylinder pistons 6, 7 to move back in the brake release direction (with the actuating force at the brake pedal 3 remaining unchanged) until the central valves 8, 9 will open and thus will reduce the pressure increased in the working chambers 4, 5 until the actuating pressure predetermined by the actuating force at the brake pedal 3 will have been reached again. The central valves 8, 9 of the master brake cylinder 1, together with the master cylinder pistons 6, 7 will thus perform the control function required to keep the pressure in the brake lines 13, 14 on the level predetermined by the actuating force applied to the brake pedal 3. A specific pressure control will thus not be needed at the pump aggregate 29. In case of brake slip control, the operation of the pump aggregate 29 will be monitored by the differential pressure alarm switch 33.

Upon the start of the pump aggregate 29, the solenoid valves 15, 16 and 21, 22 will simultaneously be actuated by the brake slip control device 40 in correspondence with the predetermined control characteristic so as to prevent lock-up of the vehicle wheels by periodically building up and reducing the pressure in the wheel brakes 18, 19. The pressure medium volume required for these control operations will be taken from the pump stream while the master cylinder pistons 6, 7 will remain in the moved-back control position.

The differential pressure alarm switch 33 will register any leak in the brake lines 13, 14 or any failure of the pump pressure in the pressure line 28 and, if necessary, will switch off the brake slip control device. In such a case, by means of the master brake cylinder 1 and of the brake booster 2, it will be possible to continue actuating the intact part of the brake system and to brake the vehicle to a halt.

Figure 2:
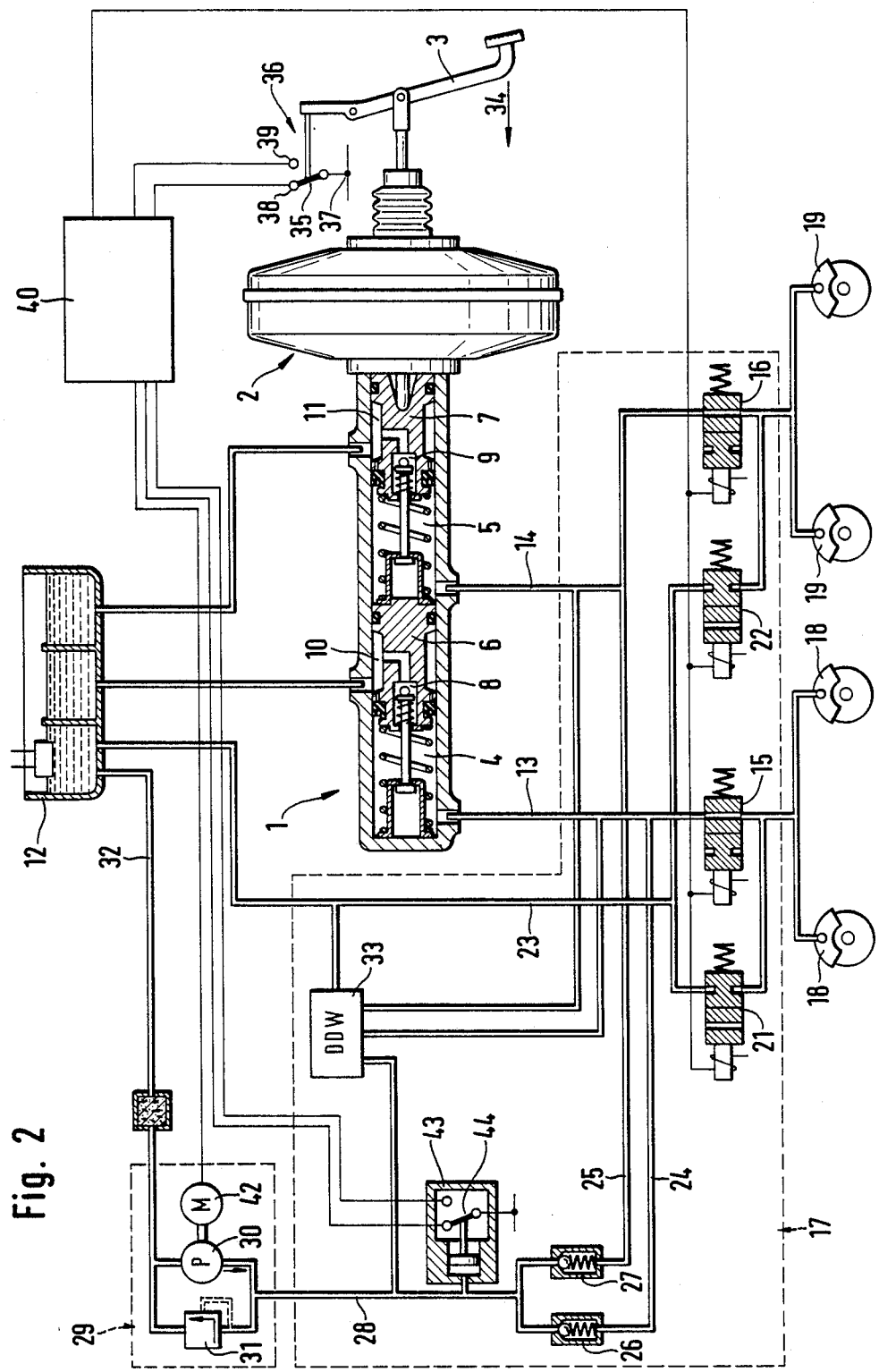

The embodiment of a hydraulic dual circuit brake system represented in FIG. 2 differs from the brake system shown in FIG. 1 only in that no timing relay is provided but rather a pressure switch 43 is provided. Thus, like parts have been assigned like reference numerals in FIGS. 1 and 2. Pressure switch 43 is connected with the pressure line 28 supplied by the pump 30.

The pressure switch 43 has a change-over switch 44. It can be preset to a desired response threshold of the pressure The input of the change-over switch 44 is applied to a voltage such as the battery voltage. The operating current output of the change-over switch 44 is applied to a voltage such as the battery voltage. The operating current output of the change-over switch 44 is connected with the brake slip control device 40. In the brake slip control device 40 the signals of the change-over switches 36 and 44 will be combined with each other. In correspondence with the result of the combination, the drive 42 will be switched on and off, respectively.

Conjunctively combined are the signal available at the operating current output of the change-over switch 36 and the inverted signal of the operating current output of the change-over switch 44. It could also be possible to conjunctively combine the signal at the quiescent current output of the change-over switch 44 and the signal at the operating current output of the change-over switch 36. The result of the combination wil be the control signal for the drive 42. The drive 42 will be switched on if, due to the actuation of the brake pedal 3, a corresponding signal appears at the operating current output 38. The pressure switch 43 must not have responded in this action. As soon as the pressure switch 43 responds the drive 42 will be switched off again. This logical combination, however, will be put out of operation by the control signals the brake slip control device 40 will generate for the drive 42 during brake slip control, that is, in case of brake slip control. The signal of the pressure switch 43 which governs the switching-off of the drive 42 will be rendered ineffective by the control signals.

The mode of operation of the brake system illustrated in FIG. 2 corresponds with that of the brake system shown in FIG. 1 except for switching-on of the drive 42. Switching-on of the drive 42 will be effected by the actuation of the change-over switch 36. Thereupon, the pump 30 will deliver pressure medium into the brake cylinders 18, 19. In doing so, there will be a fast pressure build-up by means of which the pistons, while overcoming the clearance, will be moved with the brake pads against the braking surfaces. Even when the brake pads have contact with the braking surfaces, the pressure will continue to increase until the pump 30 will switch off. The pressure switch 43, therefore, is adjusted so as to cause the brake slip control device 40 to switch off the drive 42 when a threshold value is exceeded. In the present instance, the pump 30 will be put out of operation by the pressure switch 43 as soon as the pressure reaches a value corresponding to the compensation of the clearance. Thereupon, the braking action will proceed in the same manner as described in connection with the device according to FIG. 1.

Any special adaptation measures of the brake system with regard to the respective clearance are likewise avoided in the device according to FIG. 2. Except for the adjustment of the response value of the pressure switch 43, no adjusting operations are required. The response value may be the same for brakes with different clearances.

What is claimed is:

1. A hydraulic brake system for automotive vehicles with a master brake cylinder connected to an unpressurized reservoir and with a brake line connected to a working chamber of the master brake cylinder and leading to pressure control valves of a brake slip control device, which pressure control valves are followed by at least one wheel brake, with the working chamber of the master brake cylinder being connectable to a pressure medium source upon the start of the brake slip control device, means for detecting the onset of the application of the brake pedal (3), means responsive to the detecting means for supplying a predetermined pressure medium amount coordinated with the clearance of the brake from the pressure medium source (29) to the brake cylinder of the wheel brake wherein said clearance of said brake is overcome prior to further brake pedal travel following said onset thereby to reduce the overall brake pedal travel, wherein the pressure medium source (29) contains a pump (30) with a drive (42) which by way of a switch (36) operable by the brake pedal (3), is switched on for a predetermined time during which the pressure medium required to overcome the clearance of the wheel brake flows into the wheel brake cylinder, said brake system further comprising an adjustable-response-duration time element (41) which is actuatable by means of the switch (36), the response duration of said time element (41) being adjustable to correspond to the the delivery time of the pump (30) which is required to overcome the clearance of the wheel brake.

2. A brake system as claimed in claim 1, wherein the time element (41) is a component of an electrical brake slip control device (40).

3. A hydraulic brake system for automotive vehicles with a master brake cylinder connected to an unpressurized reservoir and with a brake line connected to a working chamber of the master brake cylinder and leading to pressure control valves are followed by at least one wheel brake, with the working chamber of the master brake cylinder being connectable to a pressure medium source upon the start of the brake slip control device, means for detecting the onset of the application of the brake pedal (3), means responsive to the detecting means for supplying a predetermined pressure medium amount coordinated with the clearance of the brake from the pressure medium source (29) to the brake cylinder of the wheel brake wherein said clearance of said brake is overcome prior to further brake pedal travel following said onset thereby to reduce the overall brake pedal travel, wherein the pressure medium source (29) contains a pump (30) with a drive (42) which is switched on by way of a switch (36) operable by the brake pedal (3) and which is switched off by way of a pressure switch (43) responding to a predetermined pressure in the brake cylinder corresponding to the pressure needed to overcome the clearance in the wheel brake.

4. A brake system as claimed in claim 3, wherein a non-return valve (26, 27) is arranged between the outlet of the pump (30) and the working chamber (4, 5) of the master brake cylinder (1).

5. A brake system as claimed in claim 3, wherein the master brake cylinder (1) is a tandem master brake cylinder the two working chambers (4, 5) of which are separately connectable to the pressure medium source (29).

6. A brake system as claimed in claim 5, wherein the master brake cylinder (1) is actuatable by a vacuum brake booster (2).

* * * * *